Dec. 30, 1930.  S. C. HATFIELD  1,787,071
RESILIENT WHEEL
Original Filed April 5, 1927   2 Sheets-Sheet 2
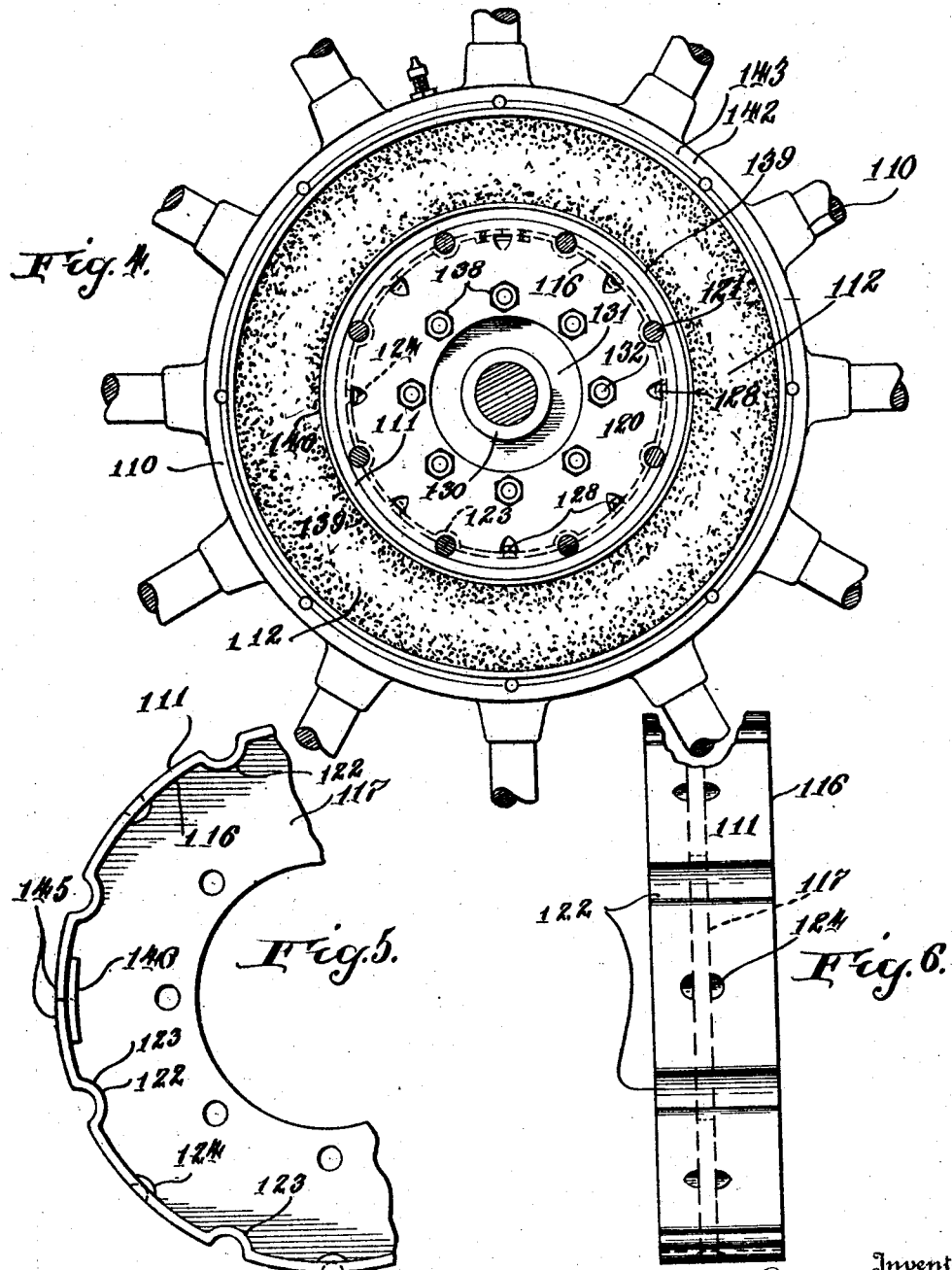

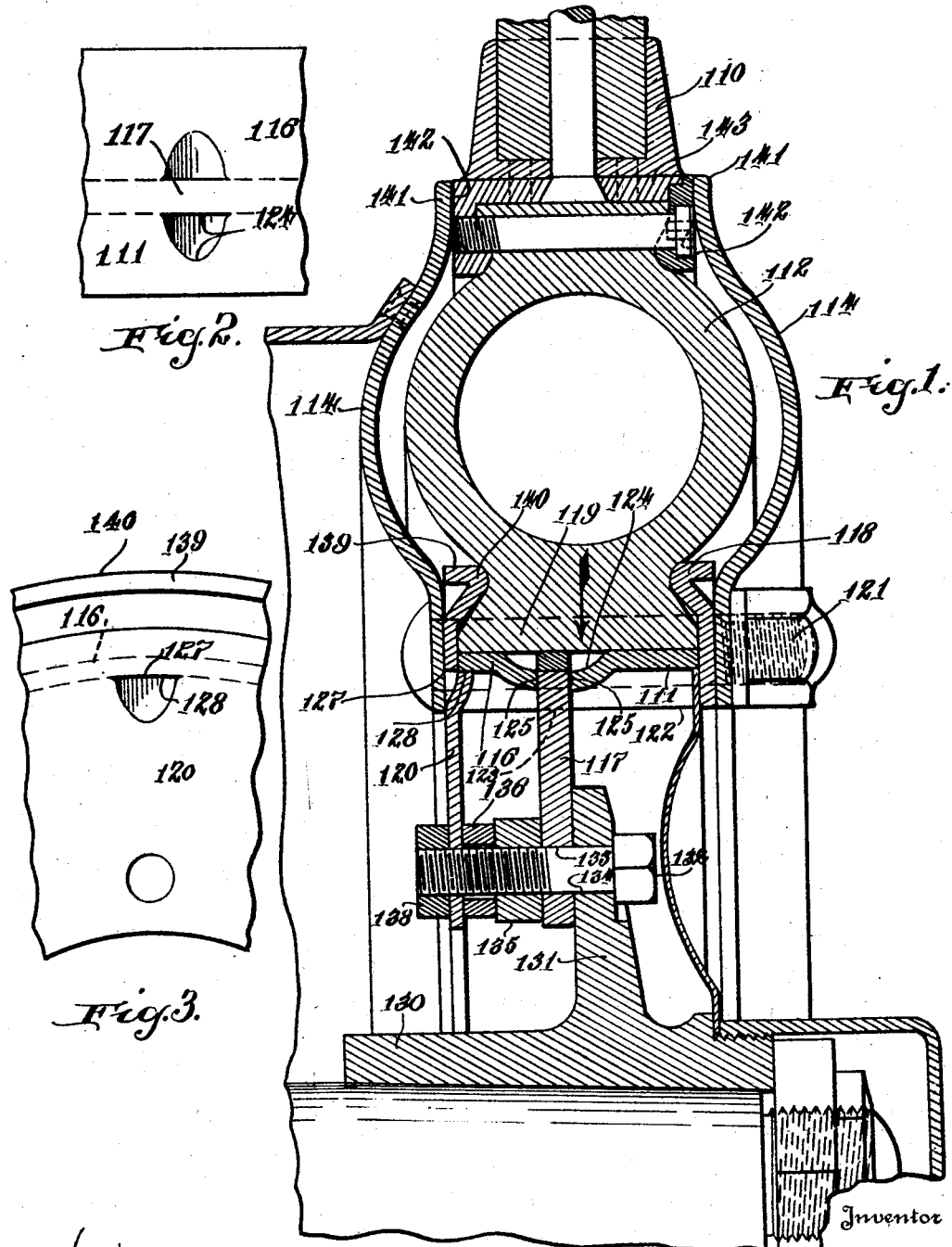

Patented Dec. 30, 1930

1,787,071

UNITED STATES PATENT OFFICE

SCHUYLER C. HATFIELD, OF BALTIMORE, MARYLAND

RESILIENT WHEEL

Application filed April 5, 1927, Serial No. 181,034. Renewed May 27, 1930.

The present invention relates to the provision of a wheel whereby harmful effects of road shock and vibration are eliminated and at the same time the necessity for maintaining pneumatic tires is dispensed with.

In accordance with the invention the wheel consists of an outer peripheral or rim section and an inner or hub section encircled by and spaced inwardly from the rim section, and a pneumatic pad between the sections preferably secured to both sections, the sections being provided with guiding means whereby the outer section is permitted and confined to a radial motion relative to the hub section.

The object of the invention is to produce an improved wheel structure which may be made partly or mostly of sheet metal, and which has numerous advantages, as cheapness, lightness, strength, durability, adaptability to various hubs, ease of assembling and knocking down for replacement, repairs, etc.

In the accompanying drawings I have illustrated an elastic wheel embodying the features of my invention in what is at present regarded as the preferred form.

In the drawings:

Figure 1 is a fragmentary radial section of the wheel.

Figure 2 is a fragmentary top plan of the hub ring.

Figure 3 is a fragmentary elevation of the hub supporting plate.

Figure 4 is an elevation of the wheel, looking from the left in Figure 1, the cover plate being removed.

Figure 5 is an elevation of the hub ring and hub plate looking from the left in Figure 1.

Figure 6 is a view of the same looking from the left in Figure 5.

In Figures 1, 2, 3, 4, 5 and 6 I have illustrated a wheel of this type. This wheel has an outer or rim section 110, an inner or hub section 111 encircled by and spaced inwardly from the rim section to permit radial motion of one relatively to the other, and a pneumatic pad 112 between the sections which are maintained in the same radial plane by cover and guide plates 114.

This structure differs from that previously patented by me in the construction of the hub member or section, whereby it may be made entirely of sheet metal which may be cold rolled or stamped into shape.

The hub member consists of a hub ring 116 which may be cold rolled or formed in any suitable way, a hub plate 117 in the form of a flat annular plate which may be of sheet metal or other material, a bead holding ring 118 engaging the inner bead 119 of the pad 112 and bead holding and hub supporting plate 120 which assists in supporting the hub ring 116 and also engages the bead 119 after the manner of one side of a clincher rim. The bead ring 118 and the bead 119 of the pad are held in position by bolts 121 placed at suitable intervals about the periphery of the hub parallel to the axis. To receive and hold these bolts the hub ring 116 is grooved or fluted at intervals as shown at 122, being turned inwardly as to the inward surface and depressed as to the outer surface forming protuberances on the inner face of the ring.

The hub plate 117 is driven or otherwise forced into position within the hub ring 116 being, in the form of the invention shown, locked against rotation therein by means of flutes 122 forming the inner surfaces of the grooves or apertures, partially encompassing the bolts 121. To engage these flutes the plate is correspondingly notched at 123. This plate is further held in position by slotted and deflected portions or lips 124, see Figures 1 and 4 to 6, formed by displacing inwardly on each side of the plate small areas of the hub ring 116. This may be accomplished by slotting the ring 116 at intervals close to each side of the plate 117, as shown in Figures 1 and 4 to 6, and depressing the material adjacent the slots on each side of the plate inwardly in the direction of the radius of the ring so as to form abutments 124 on each side of hub plate 117.

The hub ring 116 is supported on the wheel hub 130 in any suitable manner. In the form of the invention shown, the hub plate 117 is secured to the hub flange 131 by bolts 132 parallel to the axis and nuts 135. These bolts are spaced along the inner peripheral portion of the hub plate, which is apertured at 133 in registration with apertures 134 in the wheel hub flange and these bolts 132 are also passed through the supporting plate 120, being spaced therefrom by nuts 135 screwed up against the plate 117 and spacers or spacing tubes 136 encircling the bolts between the nuts and the plates 117 and 120. Nuts 138 engage the bolts 132 outside the plate 120, being tightened up against the latter to hold it in position.

The hub ring 116 is further supported by the hub supporting and bead locking ring 120. This ring is slotted at 127 on a circumference substantially equal to that of the inside of the hub ring 116 and supporting lips 128 are formed by deflecting inwardly the metal adjacent the slots on the inside. These lips 128 in the assembled position of the plate engage the hub ring from within, supporting the latter.

The outer edge 139 of the plate 120 is crimped or turned outwardly forming a bead engaging rib 140 between which and the bead engaging ring 118 the inner bead 119 of the pad 112 is held by bolts 121, as previously described. The pads are covered by cover and guide plates 114, which are secured to the hub structure by bolts 121 and bear at their outer edge portions 141 against radial flat surfaces 142 on the inner rim 143 of the outer or rim section 110, holding the latter in radial alignment and permitting motion of the hub relatively to the outer rim or rim member in a radial plane. The hub ring may be butt ended as shown in Figure 5 and secured by spot welding the ends 145 to a short underlying plate or block 146. The advantages of the sheet metal construction described as to cheapness of construction, lightness and increased strength and toughness, will be easily appreciated.

It is of interest to note that this inner rim 143 is of stamped metal provided with spoke sockets 150 from which the spokes are removable. They may be of iron or wood and conveniently replaced.

I have thus described specifically and in detail the preferred form of my invention in order that the nature and operation of the same may be clearly understood, however, the specific terms herein are used descriptively rather than in a limiting sense, the scope of the invention being defined in the claims.

What I claim as new and desire to secure by Letters Patent is:

1. An elastic wheel comprising an annular rim section, a hub section encircled by and spaced inwardly from the rim section to provide relative radial motion and a pneumatic pad between the sections, the hub section consisting of a sheet metal ring and a separate radial plate with interlocking means connecting the two together, and means securing the plate to a hub.

2. An elastic wheel comprising an annular rim section, a hub section encircled by and spaced inwardly from the rim section to provide relative radial motion and a pneumatic pad between the sections, the hub section consisting of a sheet metal ring and a separate radial plate with interlocking means connecting the two together, and means securing the plate to a hub, a second plate engaging the hub ring from within and spaced away from the first mentioned plate, the second plate having supporting means at the center of the wheel.

3. An elastic wheel comprising an annular rim section, a hub section encircled by and spaced inwardly from the rim section to provide relative radial motion and a pneumatic pad between the sections, the hub section consisting of a sheet metal ring, inwardly projecting portions, a hub plate encircled by the hub ring and notched to fit the projections of the latter.

4. An elastic wheel comprising an annular rim section, a hub section encircled by and spaced inwardly from the rim section to provide relative radial motion and a pneumatic pad between the sections, the hub section consisting of a sheet metal ring, inwardly projecting portions, a hub plate encircled by the hub ring and notched to fit the projections of the latter, the hub ring having slots on each side of the hub plate, the material forming the hub ring being deflected inwardly at said slots to engage the hub plate laterally and prevent displacement thereof.

5. An elastic wheel comprising an annular rim section, a hub section encircled by and spaced inwardly from the rim section to provide relative radial motion and a pneumatic pad between the sections, the hub section consisting of a sheet metal ring, inwardly projecting portions, a hub plate encircled by the hub ring and notched to fit the projections of the latter, and a supporting plate encircling the hub and having supporting means for the hub ring engaging the latter from within.

6. An elastic wheel comprising an annular rim section, a hub section encircled by and spaced inwardly from the rim section to provide relative radial motion and a pneumatic pad between the sections, the hub section consisting of a sheet metal ring being deflected inwardly at intervals to form protuberances, a hub plate encircled by the hub ring and notched to fit the protuberances, and a wheel hub having a flange secured to said supporting plate.

7. An elastic wheel comprising an annular rim section, a hub section encircled by and spaced inwardly from the rim section to provide relative radial motion and a pneumatic pad between the sections, the hub section consisting of a sheet metal ring deflected inwardly at intervals, a hub plate encircled by the hub ring and notched to fit the said deflected portions of the latter, the hub ring having slots on each side of the supporting plate ring, the material forming the hub ring being deflected inwardly at said slots to engage the hub plate laterally and prevent lateral displacement thereof.

8. An elastic wheel comprising an annular rim section, a hub section encircled by and spaced inwardly from the rim section to provide relative radial motion and a pneumatic pad between the sections, the hub section consisting of a sheet metal ring deflected inwardly at intervals to form grooves, a radial hub plate encircled by the hub ring and notched to fit the deflected portions of the latter, a wheel hub having a flange secured to said hub plate, the hub ring having slots on each side of the hub plate, the material forming the hub ring being deflected inwardly at said slots to engage the hub plate laterally and prevent displacement thereof, and a second radial plate encircling the hub and having supporting means for the hub ring engaging the latter from within, said supporting means comprising portions of the radial plate, the latter being slotted on the inner circumference of the hub ring and deflected inwardly at said slots.

9. An elastic wheel comprising an annular rim section, a hub section encircled by and spaced inwardly from the rim section to provide relative radial motion and a pneumatic pad between the sections, the hub section consisting of a sheet metal hub ring, a radial hub plate encircled by the hub ring and secured thereto, a wheel hub having a flange secured to said hub plate, and a second radial plate encircling the hub and having supporting means for the hub ring engaging the latter from within, the second radial plate having a bead engaging portion projecting beyond the hub ring, a bead ring secured to the opposite side of the hub member and a plurality of bolts passing through said bead engaging portion and bead engaging ring.

10. An elastic wheel comprising an annular rim section, a hub section encircled by and spaced inwardly from the rim section to provide relative radial motion and a pneumatic pad between the sections, the hub section consisting of a metal hub ring, a radial hub plate encircled by the hub ring and secured thereto, a wheel hub having a flange secured to said hub plate and a second radial plate encircling the hub and having supporting means for the hub ring engaging the latter from within, the second radial plate having a bead engaging portion projecting beyond the hub ring, a bead ring secured to the opposite side of the hub member and a plurality of bolts passing through said bead engaging portion and bead engaging ring, and engaging the hub ring.

11. A hub for an elastic wheel comprising inner and outer spaced sections and a pad having an inner bead between the sections, said hub or inner section comprising a sheet metal ring, a radial supporting plate for the same and sheet metal end plates for the hub having bead engaging outer peripheral edge portions formed thereon and clamping means for drawing the plates together on each side of the hub and clamping the inner bead of the pad between said bead engaging portions.

Signed by me at Baltimore, Maryland, this 2nd day of April, 1927.

SCHUYLER C. HATFIELD.